(12) United States Patent
Danilov et al.

(10) Patent No.: US 7,773,288 B2
(45) Date of Patent: Aug. 10, 2010

(54) DYNAMIC IMAGE REGULATOR

(75) Inventors: Oleg Borisovich Danilov, St. Petersburg (RU); Aleksander Ivanovich Sidorov, St. Petersburg (RU); Olga Petrovna Vinogradova, St. Petersburg (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 112 days.

(21) Appl. No.: 12/249,275

(22) Filed: Oct. 10, 2008

(65) Prior Publication Data

US 2009/0310210 A1 Dec. 17, 2009

(30) Foreign Application Priority Data

Oct. 12, 2007 (RU) .............................. 2007137748
Aug. 7, 2008 (KR) ..................... 10-2008-0077553

(51) Int. Cl.
 *G02B 26/00* (2006.01)
 *G02B 26/08* (2006.01)
(52) U.S. Cl. ........................ 359/292; 359/226; 359/303

(58) Field of Classification Search ......... 359/290–292, 359/296, 223–226, 198, 301–303, 237, 242
See application file for complete search history.

(56) References Cited

U.S. PATENT DOCUMENTS

| | | | | |
|---|---|---|---|---|
| 5,784,189 | A * | 7/1998 | Bozler et al. ................ | 359/254 |
| 6,312,134 | B1 * | 11/2001 | Jain et al. .................... | 359/855 |
| 2007/0279558 | A1 * | 12/2007 | Chang ......................... | 349/113 |

* cited by examiner

*Primary Examiner*—Scott J Sugarman
*Assistant Examiner*—Dawayne A Pinkney
(74) *Attorney, Agent, or Firm*—Sughrue Mion, PLLC

(57) ABSTRACT

Provided is a dynamic image regulator. The dynamic image regulator is an application device based on a micro-opto-electro-mechanical system (MOEMS). The dynamic image regulator includes a spatial light modulator comprising a plurality of holes and a plurality of controllable movable screens respectively provided at the holes, and transmitting or blocking emitted light for each respective hole; and an amplitude modulator modulating an amplitude of light passing through the spatial light modulator.

11 Claims, 3 Drawing Sheets

DYNAMIC IMAGE REGULATOR

CROSS-REFERENCE TO RELATED PATENT APPLICATION

This application claims the benefit of Russian Patent Application No. RU2007137748, filed on Oct. 12, 2007, in the Federal Service for Intellectual Property, Patents and Trademarks, and Korean Patent Application No. 10-2008-0077553, filed on Aug. 7, 2008, in the Korean Intellectual Property Office, the disclosures of which are incorporated herein in their entirety by reference.

BACKGROUND OF THE INVENTION

1. Field of the Invention

Apparatuses consistent with the present invention relate to optoelectronics, and more particularly, a dynamic image regulator used in various apparatuses for optically recording and reproducing information.

2. Description of the Related Art

Various attempts have been known for solving a problem with controlling an optical radiation intensity by using various physical and chemical effects.

For example, there are documents regarding a radiation attenuator based on a nonlinear-optical effect known as light-reduced dissipation. Light-reduced dissipation is main mechanism in attenuators based on light-reduced diffraction gratings in crystals with impurity of transition metal ions (see RU Patent No. 2282880). An attenuation effect arises due to increase in light diffusion when radiation intensity is increased.

In addition, a liquid-crystal regulator for controlling radiation intensity has been known. In the liquid-crystal regulator, a liquid-crystal layer is disposed between transparent electrodes and two crossing polarizers (see Display Device, Ed. J. I. Pankove, Springer-Verlage, Berlin, 1980). When a driving signal is applied to the liquid-crystal layer, polarization twisting occurs, and the intensity of light passing through the liquid-crystal regulator varies.

A light intensity regulator based on linear electro-optical effect includes a crystal having electro-optical effect, or organic or inorganic film having electro-optical effect, and the crystal or the film is disposed between transparent electrodes and two crossing polarizers (see, e.g., W. Brunner, K. Junge, Wissensspeicher Lasertechnic, VEB Fachbuchverlag, Leipzig, 1987). When a driving electric signal is applied to the electro-optical crystal or film, the polarization twisting occurs, and the intensity of light passing through the liquid-crystal regulator varies.

A light intensity regulator based on a linear electrochromic effect includes a film formed of inorganic or organic electrochromic material and electrolyte. The film and the electrolyte are disposed between transparent electrodes (see, e.g., D. M. DeLongchamp, M. Kastantin, P. T. Hammond, Chem. Mater. 15. P.1575, 2003). When a driving electric signal is applied to the electrodes, a chemical composition of the film changes, and the transmissivity of the film varies.

Also, a light modulator based on total internal reflection distortion (TIRD) has been well known. Modulation mechanism of the light modulator is based on a thickness variation in a gap between two total internal reflection prisms, or on variation in refraction index of a layer disposed in the gap. This variations lead to change in conditions of tunneling an electromagnetic wave from a first prism into a second prism, and, as a result, to change in transmissivity and reflectivity of the light modulator. The light modulator based on TIRD can be used as a radiation attenuator driven by an external driving signal. A gap value between the prisms is changed, for example, by a piezoelectric mover (see, e.g., RU Patent No. 2022433, U.S. Pat. Nos. 5,555,327 and 5,841,916), or by magnetostriction elements (see, e.g., RU Published Patent Application No. 96103862).

The light modulator based on TIRD is advantageous in that light diffusion led to distort an image does not occur, design can be simplified, and temperature operation range is wide.

On the other hand, the light modulator based on TIRD is disadvantageous in that it is complicated to control the brightness and region of individual image point.

A light modulator based on reflective-type micro-opto-electro-mechanical systems (MOEMSs) has been known. Reflective-type MOEMSs are an array of micro-mirrors whose spatial arrangement is specified by an electrical signal (see, e.g., M. Hoffmann, E. Voges, Bulk silicon micromachining for MEMS in optical communication systems, J. Micromachin. Microeng., 12. 349. 2002, L. Y. Lin, E. L. Goldstein, R. W. Tkach. Free-space micromachined optical switches for optical networking, IEEE J. Sel. Top. Quant. Electr. (MOEMS), 5. 4. 1999.). Micro-mirrors are controlled by an electrostatic manner, piezo-mover or thermal actuator expansion or bending. For example, in U.S. Pat. No. 7,224,512, an element stopping an optical device at two or more locations by using an electrically-neutral limiter is used in order to move the optical device.

Reflective-type MOEMSs are advantageous in that the amplitude of spaced optical signals can be digitally controlled in telecommunication systems. However, reflective-type MOEMSs are disadvantageous in that only two states of each system element, i.e., an open state and a closed state are allowed and it is difficult smoothly modulate the amplitude of optical signals.

SUMMARY OF THE INVENTION

Exemplary embodiments of the present invention provide a dynamic image regulator modulating brightness of individual points or regions of an optical image.

The present invention also provides an improved dynamic image regulator including a micro-opto-electro-mechanical system (MOEMS).

According to an aspect of the present invention, there is provided a dynamic image regulator comprising a spatial light modulator comprising a plurality of holes and a plurality of controllable movable screens respectively provided at the holes, and transmitting or blocking emitted light for each respective hole; and an amplitude modulator modulating an amplitude of light passing through the spatial light modulator.

The spatial light modulator may be a micro-opto-electro-mechanical system (MOEMS).

Each of the holes may have a cylindrical shape.

The spatial light modulator may comprise two sub spatial light modulators, and the two sub spatial light modulators may be disposed so that holes of slit-shaped holes are perpendicular to each other.

The amplitude modulator may be a liquid crystal regulator, an optical modulator based on total internal reflection distortion (TIRD) or an optical modulator based on magnetic change.

The dynamic image regulator may further comprise a photodetector detecting light passing through the amplitude modulator; and an amplitude modulation controlling electronic device generating a driving signal reducing transmissivity of the amplitude modulator when an amplitude of a signal detected by the photodetector exceeds a predetermined level.

The dynamic image regulator may further comprise: a control and synchronization circuit switching a movable screen of the spatial light modulator.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION OF THE INVENTION

Figure 1:
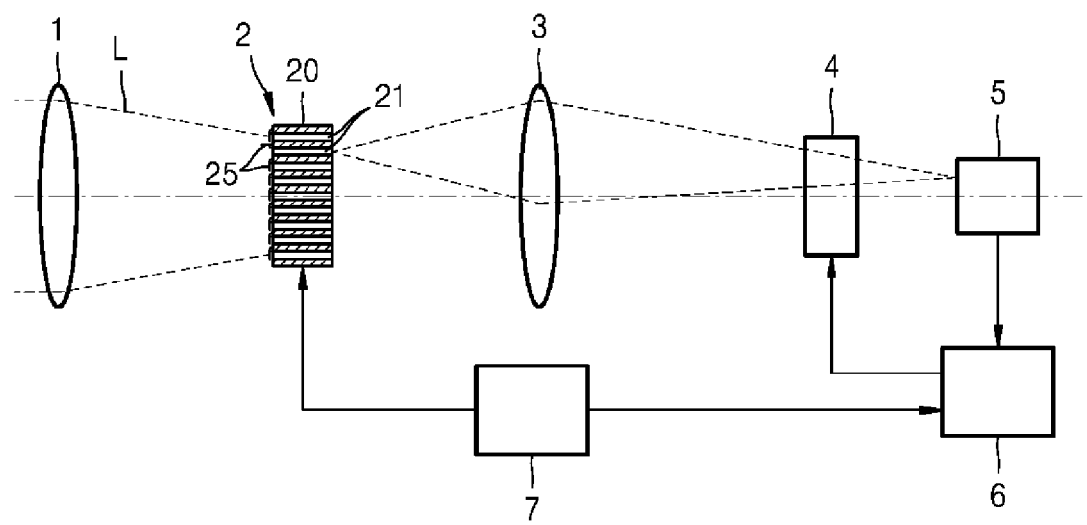
FIG. 1 illustrates a dynamic image regulator according to an embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art. The same reference numerals in the drawings denote the same element. In the drawings, the thicknesses of layers and regions are exaggerated for clarity.

Figure 2A:
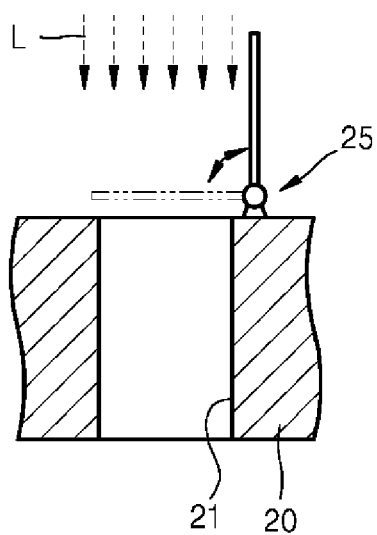
FIG. 2A illustrates a spatial light modulator including a movable screen, according to an embodiment of the present invention.
Figure 2B:
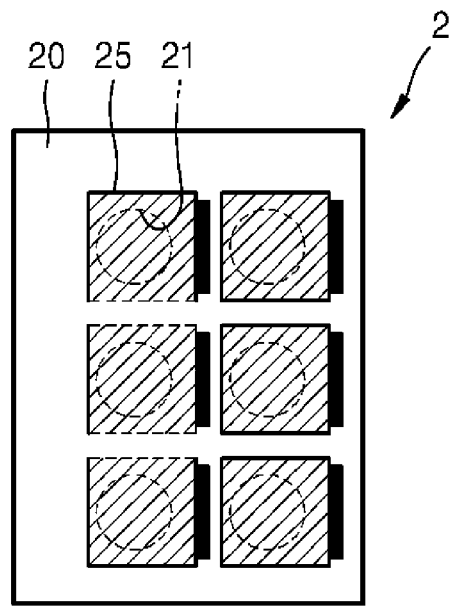
FIG. 2B is a top view of a spatial light modulator having cylindrical-shaped holes, according to another embodiment of the present invention.
Figure 2C:
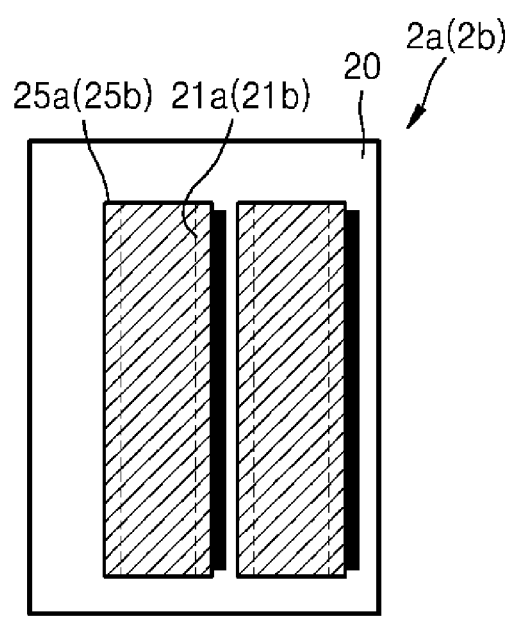
FIG. 2C is a top view of a spatial light modulator having slit-shaped holes, according to another embodiment of the present invention.

FIG. 1 illustrates a dynamic image regulator according to an embodiment of the present invention. FIG. 2A illustrates a spatial light modulator 2 including a movable screen 25, according to an embodiment of the present invention. FIGS. 2B and 2C illustrate a spatial light modulator 2', according to embodiments of the present invention.

Referring to FIG. 1 the dynamic image regulator according to the present embodiment includes first and second objective lenses 1 and 3, a spatial light modulator 2, an amplitude modulator 4, a photodetector 5, an amplitude modulation controlling electronic device 6 and a control and synchronization circuit 7.

The first objective lens 1 projects an image on the spatial light modulator 2. The second objective lens 3 focuses light passing through the spatial light modulator 2 to the photodetector 5.

The spatial light modulator 2 has a micro-opto-electro-mechanical system (MOEMS) configuration including a base 20 having a plurality of holes 21 formed therein, and movable screens 25 disposed at the holes 21. As illustrated in FIG. 2A, the movable screens 25 are controlled by an electrical signal so as to each block or transmit light "L" incident in the holes 21. The hoes 21 formed in the base 20 may have a cylindrical shape, as illustrated in FIG. 2B. The holes 21 may be arranged in a planar form, as illustrated in FIG. 2B, or alternatively, may be arranged in a linear form, etc. The movable screen 25 may have a shape corresponding to the holes 21 so as to cover the holes 21. The movable screen 25 can be driven by an electrostatic manner, piezo-mover or thermal actuator expansion or bending. The movable screen 25 may be driven by MOEMS technologies. MOEMS technologies are well known to the art as described in the description of a spatial light modulator.

Figure 2D:
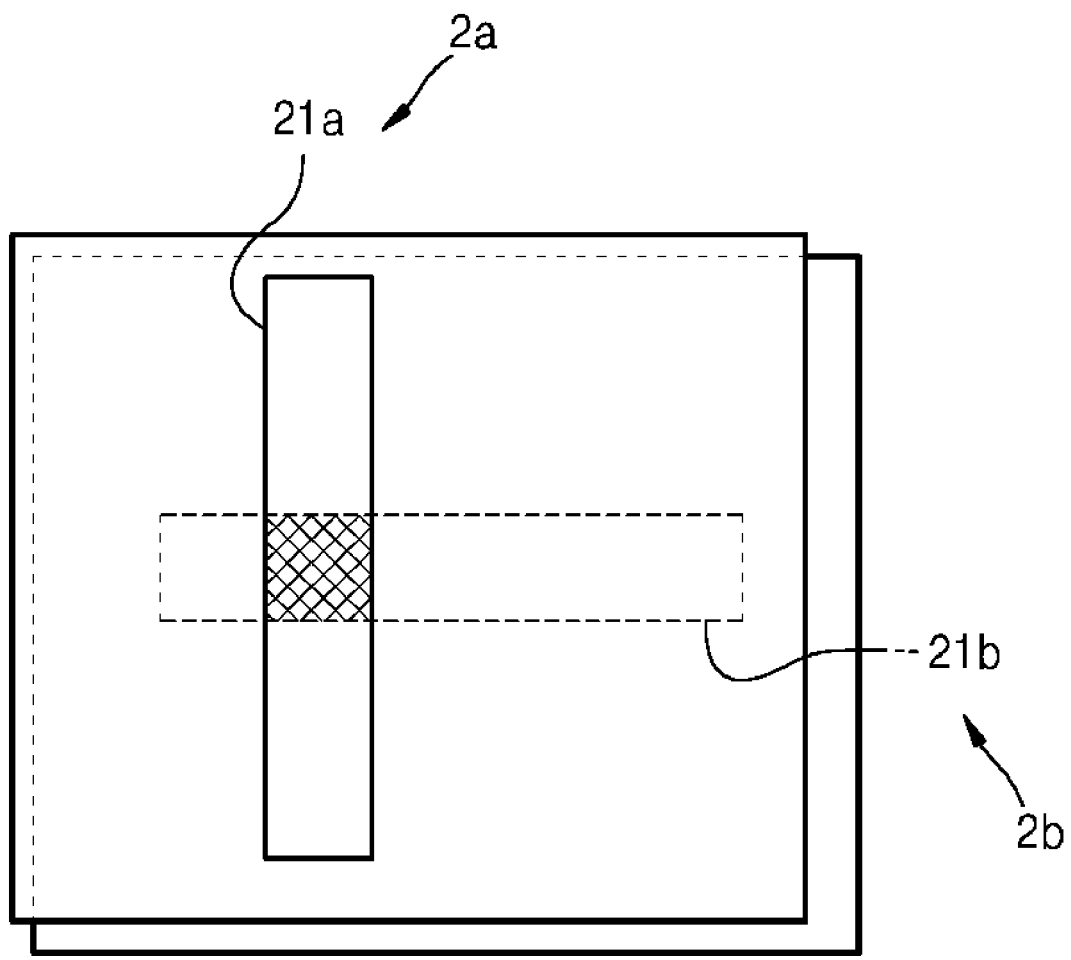
FIG. 2D illustrates the case where micro-opto-electro-mechanical systems (MOEMSs) of the spatial light modulator illustrated in FIG. 2C are perpendicular to each other, according to an embodiment of the present invention.

The shapes of the holes 21 are not limited to a cylindrical shape. That is, the holes 21 may have a slit shape or various shapes. FIGS. 2C and 2D illustrate the case where a hole has a slit shape. A slit-type spatial light modulator 2' may include two sub spatial light modulators 2a and 2b. The two sub spatial light modulators 2a and 2b may each be configured as an MOEMS including a plurality of slit-type holes 21a and 21b and movable screens 25a and 25b respectively corresponding to the slit-type holes 21a and 21b. The two sub spatial light modulators 2a and 2b may overlap each other. In addition, the two sub spatial light modulators 2a and 2b may be disposed such that each longitudinal side of the holes 21a and 21b perpendicularly cross each other, as illustrated in FIG. 2D.

Referring back to FIG. 1, various modulators modulating an amplitude may be used as the amplitude modulator 4. For example, a liquid regulator, an optical modulator based on total internal reflection distortion (TIRD), or an optical modulator based on magnetic change may be used as the amplitude modulator 4. For example, the optical modulator based on TIRD includes two prisms having a controllable gap therebetween, and the gap can be controlled by an electrical signal.

Next, an operation of the dynamic image regulator will now be described.

At every instant, the movable screen 25 of the spatial light modulator 2 may be open or closed. When one of the movable screen 25 is open, the light L corresponding to a single image point or region may be transmitted through the hole 21 corresponding to the movable screen 25. In the optical modulator 2' illustrated in FIGS. 2C and 2D, in order to transmit light corresponding to a signal image point (a region), the slit-type holes 21a and 21b (see FIG. 2D) respectively corresponding to the sub spatial light modulators 2a and 2b are simultaneously opened.

Light passing through the opened hole 21 is received at the photodetector 5 via the amplitude modulator 4. The photodetector 5 detects a signal corresponding to a signal image point (region) from emitted light. When an amplitude of the detected signal exceeds a predetermined level, the amplitude modulation controlling electronic device 6 generates a driving signal for reducing transmissivity of the amplitude modulator 4. The control and synchronization circuit 7 may perform sequential switching of the movable screen 25 of the spatial light modulator 2, may perform image scanning, and then may perform timing of a signal of the photodetector 5 with respect to a control signal of the spatial light modulator 2.

The dynamic image regulator according to the present invention can be used in a smart optical switch for memory devices, optical recording of information (multilevel, non-binary, etc.) optically recording information in a memory device, a multi layers, an optical analyzer used in screens or monitor, a laser radiation intensity modulator, etc.

The dynamic image regulator can be also used for protecting a photodetector or a photodetector array from a damage or saturation by intense radiation.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A dynamic image regulator comprising:
   a spatial light modulator comprising a plurality of holes and a plurality of controllable movable screens respectively provided at the plurality of holes, each of the plurality of controllable movable screens transmitting or blocking light received at each respective one of the plurality of holes; and
   an amplitude modulator modulating an amplitude of light passing through the spatial light modulator.

2. The dynamic image regulator of claim 1, wherein the spatial light modulator is a micro-opto-electro-mechanical system (MOEMS).

3. The dynamic image regulator of claim 1, wherein each of the plurality of holes has a cylindrical shape.

4. The dynamic image regulator of claim 1, wherein the spatial light modulator comprises two sub spatial light modulators,
   wherein the plurality of holes comprises two slit-shaped holes and
   wherein the two sub spatial light modulators are disposed so that the two slit-shaped holes are perpendicular to each other.

5. The dynamic image regulator of claim 1, wherein the amplitude modulator is a liquid crystal regulator, the liquid crystal regulator being an optical modulator based on total internal reflection distortion (TIRD) or an optical modulator based on magnetic change.

6. The dynamic image regulator of claim 1, further comprising:
   a photodetector which detects light passing through the amplitude modulator; and
   an amplitude modulation controlling electronic device which generates a driving signal reducing transmissivity of the amplitude modulator if an amplitude of a signal detected by the photodetector exceeds a predetermined level.

7. The dynamic image regulator of claim 1, further comprising:
   a control and synchronization circuit which switches the plurality of movable screens of the spatial light modulator.

8. The dynamic image regulator of claim 7, wherein the control and synchronization unit sequentially switches the plurality of movable screens to perform image scanning.

9. The dynamic image regulator of claim 7, wherein the control and synchronization unit sequentially switches the plurality of movable screens to output light in a scanning pattern.

10. The dynamic image regulator of claim 1, wherein one of the plurality of controllable movable screens is in an open position so that light received at corresponding one of the plurality of holes travels out of the corresponding one of the plurality of holes, and the one of the plurality of controllable movable screens is in a closed position to block the light received at corresponding one of the plurality of holes.

11. The dynamic image regulator of claim 10, wherein the one of the plurality of controllable movable screens is controlled by an electrical signal, electrostatics, piezo-mover, thermal actuator expansion or bending, or micro-opto-electro-mechanical system.

* * * * *